(12) United States Patent
Skapof et al.

(10) Patent No.: US 9,199,562 B2
(45) Date of Patent: Dec. 1, 2015

(54) VEHICLE CONSOLE WITH SLIDING AND PIVOTING ARMREST ASSEMBLY

(71) Applicant: Honda Motor Co., Ltd., Tokyo (JP)

(72) Inventors: Robert A. Skapof, Dublin, OH (US); Neal W. Luginbill, Marysville, OH (US); Cordell L. Bosma, Powell, OH (US)

(73) Assignee: Honda Motor Co., Ltd., Tokyo (JP)

( * ) Notice: Subject to any disclaimer, the term of this patent is extended or adjusted under 35 U.S.C. 154(b) by 57 days.

(21) Appl. No.: 14/210,510

(22) Filed: Mar. 14, 2014

(65) Prior Publication Data

US 2015/0258923 A1    Sep. 17, 2015

(51) Int. Cl.
*B60N 2/46*     (2006.01)
*B60R 7/04*     (2006.01)

(52) U.S. Cl.
CPC ............ *B60N 2/4606* (2013.01); *B60N 2/4646* (2013.01); *B60R 7/04* (2013.01)

(58) Field of Classification Search
CPC ....... B60N 2/4606; B60N 2/4646; B60R 7/04
USPC .......................... 296/24.34, 37.8, 1.09, 24.46
See application file for complete search history.

(56) References Cited

U.S. PATENT DOCUMENTS

| | | | |
|---|---|---|---|
| 4,934,750 A * | 6/1990 | Eichler et al. | 296/37.8 |
| 5,647,652 A | 7/1997 | Zalewski et al. | |
| 6,045,173 A | 4/2000 | Tiesler et al. | |
| 6,244,648 B1 * | 6/2001 | Gackstatter | 296/37.8 |
| 6,932,402 B2 | 8/2005 | Niwa et al. | |
| 7,004,527 B2 | 2/2006 | Niwa et al. | |
| 7,614,674 B2 | 11/2009 | Shiono et al. | |
| 7,770,953 B2 * | 8/2010 | Koarai | 296/24.34 |
| 7,984,942 B2 * | 7/2011 | Schaupensteiner et al. | 296/37.12 |
| 8,167,348 B2 * | 5/2012 | Fesenmyer | 296/24.34 |
| 8,353,549 B2 * | 1/2013 | Buchheit | 296/37.12 |

FOREIGN PATENT DOCUMENTS

| | | | | |
|---|---|---|---|---|
| JP | 2000177462 A * | 6/2000 | | B60N 2/46 |
| JP | 2001080423 | 3/2001 | | |

* cited by examiner

Primary Examiner — Jason S Morrow
Assistant Examiner — E Turner Hicks
(74) Attorney, Agent, or Firm — Rankin, Hill & Clark LLP

(57) ABSTRACT

A sliding and pivoting armrest assembly for a vehicle console includes a closure member pivotally mounted to the vehicle console, an armrest member slidably mounted to the closure member, and a latching device for selectively latching the closure member in a closed position. The latching device includes at least one latching member selectively receivable in at least one latching aperture defined in the closure member, at least one pushing member disposed on the closure member and moveable to remove the at least one closure member from the at least one latching aperture, and an actuator moving the at least one pushing member.

20 Claims, 7 Drawing Sheets

VEHICLE CONSOLE WITH SLIDING AND PIVOTING ARMREST ASSEMBLY

BACKGROUND

Conventional console armrests typically span the entire width of the console (i.e., lateral direction in a vehicle) to which the armrest is secured. For example, the console may include lateral sidewalls defining a storage compartment and the armrest may be disposed over the storage compartment to close the storage compartment. The armrest may be pivotable to an open position for providing access to the storage compartment. In this typical arrangement, the lateral sidewalls of the console provide primary underside support to the armrest. That is, the armrest rests against upper ends of the lateral sidewalls when in the closed position. Also in the conventional armrest, a latch is typically provisioned at the most-forward part of the armrest for connecting to a forward wall of the console.

SUMMARY

According to one aspect, a vehicle console with a sliding and pivoting armrest assembly includes a console structure, a closure member, an armrest member and a latching device for selectively latching of the closure member and the console structure. The console structure defines a storage compartment and the closure member is pivotally mounted to the console structure for movement between a pivot open position and a pivot closed position. Access is provided to the storage compartment when the closure member is in the pivot open position. The closure member closes the storage compartment when the closure member is in the pivot closed position. The armrest member is slidably mounted to the closure member for movement between a slide forward position and a slide rearward position. The latching device includes at least one latching member, at least one pushing member and an actuator. The at least one latching member protrudes from the console structure and is receivable within at least one latching aperture defined by the closure member to latch the closure member in the pivot closed position. The at least one pushing member is moveably mounted to the closure member and arranged for pushing the at least one latching member out of the at least one latching aperture to unlatch the closure member from the console structure. The actuator is disposed on the closure member and arranged to move the at least one pushing member upon actuation to unlatch the closure member.

According to another aspect, a sliding and pivoting armrest assembly for a vehicle console includes a closure member pivotally mounted to the vehicle console, an armrest member slidably mounted to the closure member, and a latching device for selectively latching the closure member in a closed position. The latching device includes at least one latching member selectively receivable in at least one latching aperture defined in the closure member, at least one pushing member disposed on the closure member and moveable to remove the at least one closure member from the at least one latching aperture, and an actuator moving the at least one pushing member.

According to a further aspect, a vehicle armrest assembly includes a pivoting closure member, a sliding armrest member moveably mounted to the pivoting closure member and a latching device. The latching device includes spring biased pins urged laterally inward toward one another into latching apertures defined by the pivoting closure member. The latching member further includes pushing pins moveable by an actuator to force the spring biased pins against the urging out of the latching apertures.

DETAILED DESCRIPTION

Figure 1:
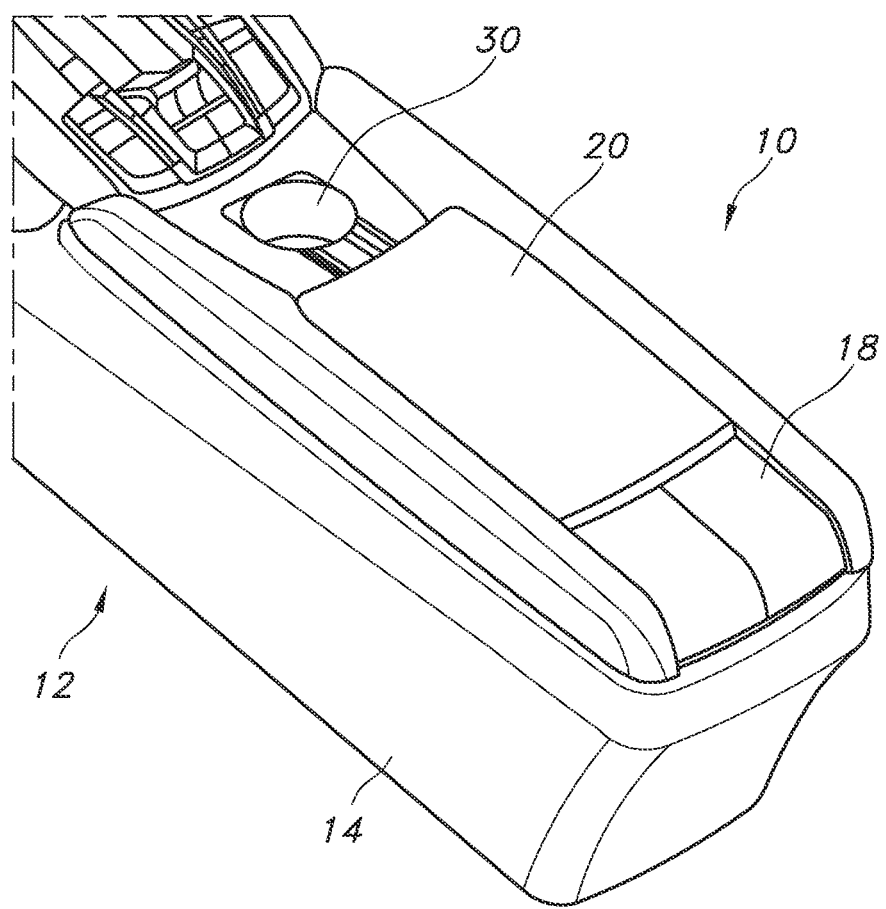
FIG. 1 is a partial perspective view of a vehicle console with a sliding and pivoting armrest assembly according to an exemplary embodiment shown with an armrest member of the assembly in a slide forward position.

Referring now to the drawings wherein the showings are for purposes of illustrating one or more exemplary embodiment and not for purposes of limited the same, FIGS. 1-7 illustrate a sliding and pivoting armrest assembly 10 for a vehicle console 12 according to one exemplary embodiment. The vehicle console 12 includes a console structure 14 defining a storage compartment 16. The armrest assembly 10 (which can also be referred to herein as a vehicle armrest assembly) includes a pivoting closure member 18, a sliding armrest member 20 and a latching device 22 (FIG. 6) for selectively latching the closure member 18 and the console structure 14. The closure member 18 is pivotally mounted to the console structure 14 for movement between a pivot open position (shown in FIG. 3) wherein access is provided to the storage compartment 16 and a pivot closed position (shown in FIGS. 1-2 and 4-5) wherein the closure member 18 closes the storage compartment 16. The latching device 22 selectively latches the closure member 18 in the pivot closed position. The armrest member 20 is moveably mounted, and particularly slidably mounted, to the closure member 18 for movement between a slide forward position (shown in FIGS. 1 and 4) and a slide rearward position (shown in FIGS. 2 and 5).

Figure 3:
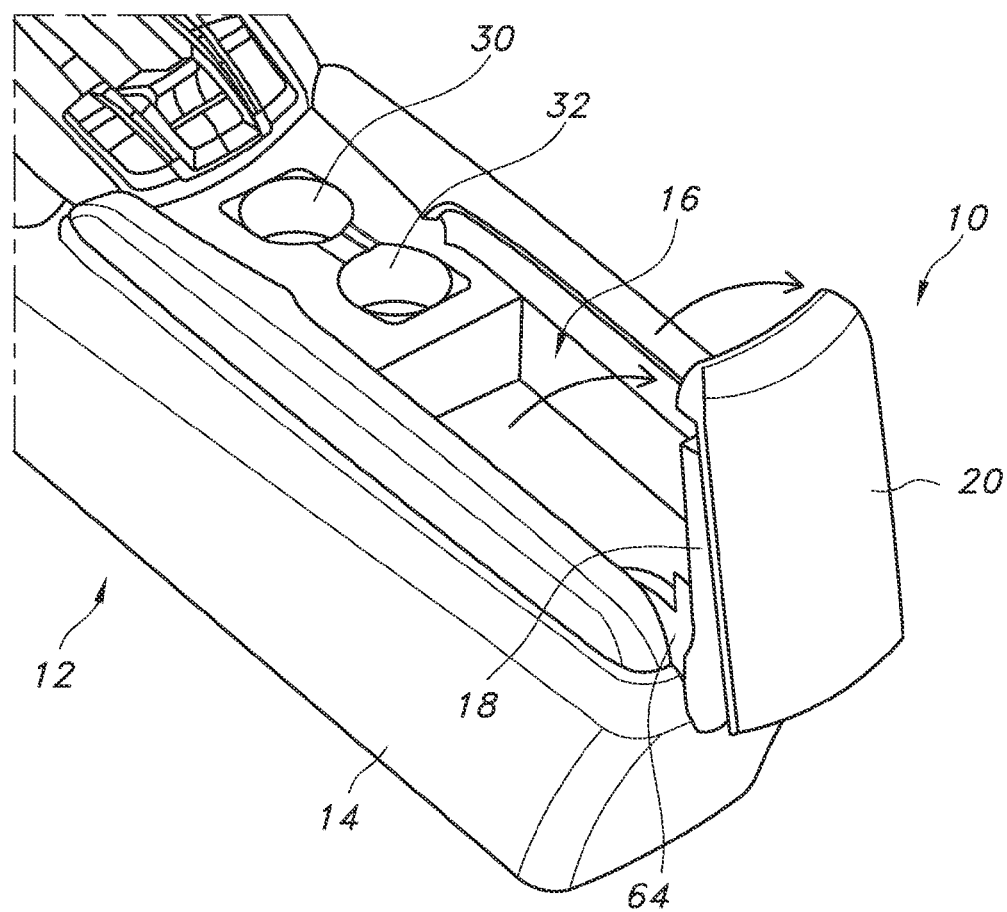
FIG. 3 is a partial perspective view similar to FIG. 2 but showing a closure member of the assembly pivoted to a pivot open position.
Figure 4:
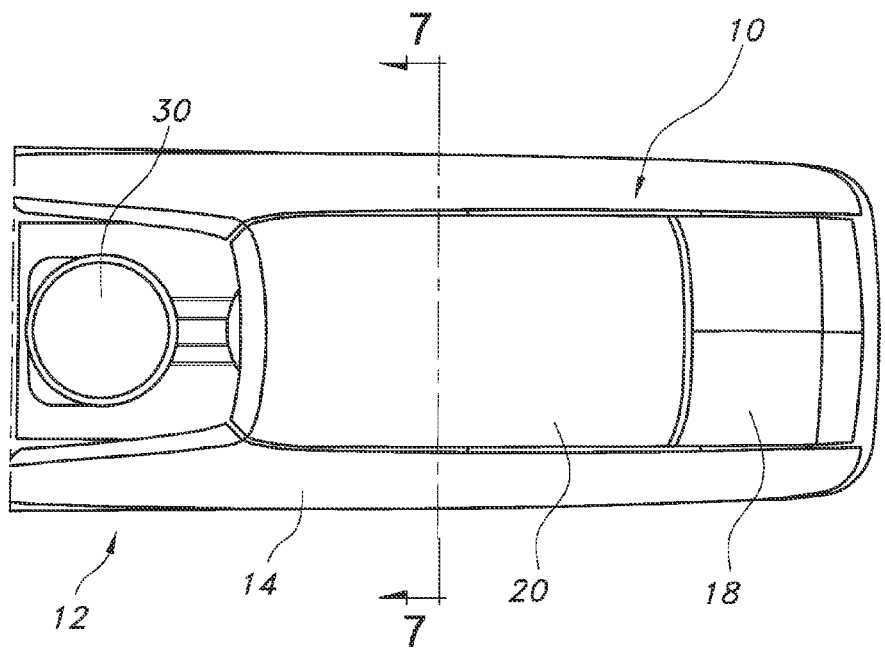
FIG. 4 is a top plan view of the vehicle console and sliding and pivoting armrest assembly corresponding to FIG. 1 (i.e., showing the armrest member in the slide forward position).
Figure 5:
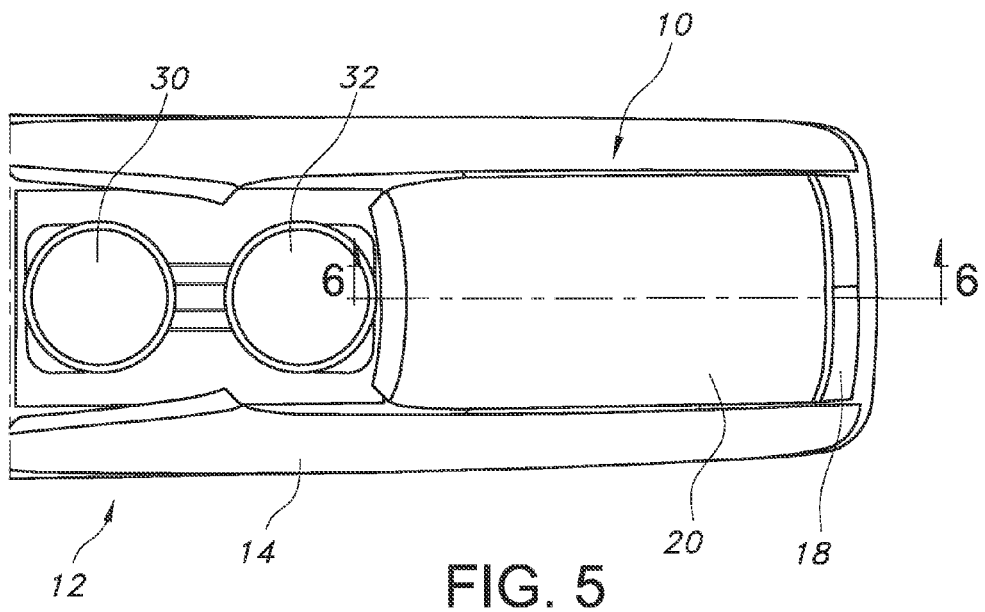
FIG. 5 is a top plan view similar to FIG. 4 but showing the armrest member in a position corresponding to FIG. 2 (i.e., shown in a slide rearward position).
Figure 6:
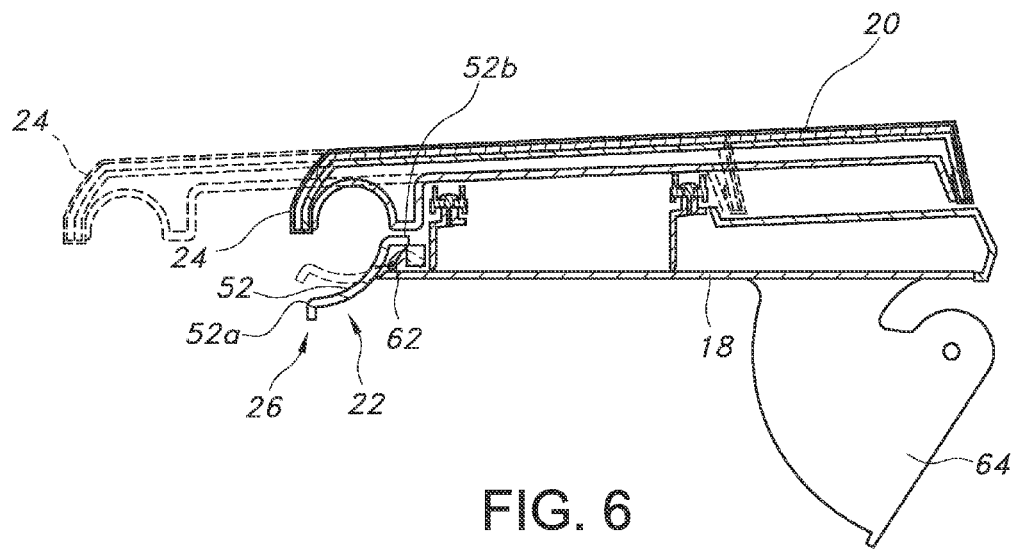
FIG. 6 is a cross-sectional view of the sliding and pivoting armrest assembly taken along the line 6-6 of FIG. 5.

As shown in FIGS. 1, 4 and 6, the armrest member 20 extends forward of the closure member 18 when the armrest member 20 is in the slide forward position. In contrast, as shown best in FIG. 6, a forward end 24 of the armrest member 20 is approximately aligned with a forward end 26 of the closure member 18 when the armrest member 20 is in the slide rearward position. In the illustrated embodiment, the console structure 14 defines cup holders 32, 34. As shown, the cup holder 32 is positioned forwardly relative to the cup holder 34 where forwardly is defined relative to a direction of travel for a vehicle (not shown) in which the vehicle console 12 would be disposed. As such, the cup holder 32 can be referred to as a forward cup holder and the cup holder 34 can be referred to as a rearward cup holder. In the illustrated embodiment, the forward cup holder 30 is always exposed and accessible regardless of a position of the armrest member 20. In contrast, the rearward cup holder 32 is exposed and accessible only when the armrest member 20 is in the slide rearward position shown in FIGS. 2, 3 and 5. The rearward cup holder 32 is covered and inaccessible when the armrest member 20 is in the slide forward position and the closure member 18 is in the pivot closed position as shown in FIGS. 1 and 4.

Figure 7:
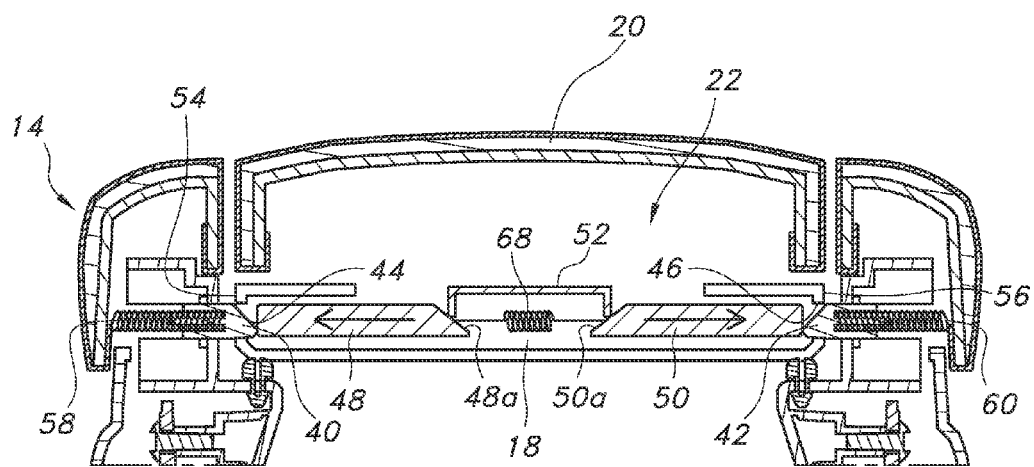
FIG. 7 is a partial cross-sectional view of the vehicle console taken along the line 7-7 of FIG. 4.

With reference to FIGS. 6 and 7, the latching device 22 can include at least one latching member (e.g., latching members 40, 42) protruding from the console structure 14 and receivable within at least one latching aperture (e.g., latching apertures 44, 46) defined by the closure member 18 to latch the closure member 18 in the pivot closed position. The latching device 22 can additionally include at least one pushing member (e.g., pushing members 48, 50) moveably mounted to the closure member 18 and arranged for pushing the at least one latching member out of the at least one latching aperture to unlatch the closure member 18 from the console structure 14. Additionally, the latching device 22 can include an actuator 52 disposed on the closure member 18 defining the forward end 26 of the closure member 18 and can be arranged to move the at least one pushing member upon actuation to unlatch the closure member 18. Optionally, though not shown, the actuator 52 can be biased (e.g., via a spring) in a first rotation direction (e.g., counterclockwise in FIG. 6) so that the actuator 52 is urged toward a non-actuated position.

More particularly, in the illustrated embodiment, the at least one latching member is a pair of latching members 40, 42 each protruding or urged laterally inwardly from the console structure 14 and the at least one latching aperture is a pair of latching apertures 44, 46 defined in lateral sides 54, 56 of the closure member 18 for receipt of the pair of latching members 40, 42. Also in the illustrated embodiment, the at least one pushing member is a pair of pushing members 48, 50 that move laterally outwardly upon actuation of the actuator 52 to push the pair of latching members 40, 42 out of the pair of latching apertures 44, 46. As shown, the latching members 40, 42 can each be spring biased laterally inwardly toward and into their respective latching apertures 44, 46 when the closure member 18 is in the pivot closed position. For example, in the illustrated embodiment, biasing mechanisms in the form of springs 58, 60, respectively, urge each of the latching members 40, 42 into respective ones of the latching apertures 44, 46. Similarly, the pushing members 48, 50 can each be spring biased laterally inwardly toward one another. For example, in the illustrated embodiment, a biasing mechanism in the form of a spring 68 can urge or pull the pushing members 48, 50 toward one another and away from acting on the latching members 40, 42.

As will be described in more detail below, actuation of the actuator 52 moves the pushing members 48, 50 laterally outwardly into the latching members 40, 42 against the urging of the respective springs 58, 60 and out of the respective latching apertures 44, 46. More particularly still, the latching members 40, 42 can be and are shown as spring biased pins urged, respectively, laterally inwardly toward one another into the latching apertures 44, 46 defined by the closure member 18. Similarly, the pushing members 48, 50 can be pushing pins that are moveable by the actuator 52 to force the spring biased pins 40, 42 against the urging provided by the springs 58, 60 and out of the latching apertures 44, 46 to unlatch the closure member 18 and allow pivotable movement from the pivot closed position to the pivot open position.

As best shown in FIG. 6, the actuator 52 is disposed on or adjacent (or forms part of) the forward end 26 of the closure member 18. Thus, the actuator 52 is disposed or forms the forward end 24 of the closure member 18 and the latching members 40, 42 are arranged to protrude into the lateral sides 54, 56, and particularly into the latching apertures 44, 46 defined in the lateral sides 54, 56 of the closure member 18. The actuator 52 is generally hidden and inaccessible when the armrest member 20 is in the slide forward position. In contrast, the actuator 52 is generally accessible when the armrest member 20 is in the slide rearward position.

As will be known and understood by those skilled in the art, the latching device 22, and particularly the actuator 52, can be pivotally mounted to the closure member 18 via a pivot pin 62 as shown in FIG. 6, though other pivotally mounting arrangements could be employed. The actuator 52 and the pivot pin 62 are arranged such that pivotal movement of the actuator 52 (e.g., clockwise in FIG. 6) actuates the actuator 52 and moves the pushing members 48, 50 into the latching members 40, 42 to remove the latching members 40, 42 from the latching apertures 44, 46 thereby unlatching the closure member 18 from the console structure 14. More specifically, the actuator 52 and the pushing members 48, 50 are arranged such that pivoting movement of the actuator 52 (e.g., clockwise in FIG. 6) via a manually applied actuation force is transferred into laterally outward movement of the pushing members 48, 50. In the illustrated arrangement, the degree of movement of the actuator 52 (i.e., the amount the actuator is rotated or pivoted) corresponds to a degree of movement of the pushing members 48, 50. As already mentioned, a spring (not shown) can optionally be included in association with the actuator 52 for urging the actuator 52 to return to the non-actuated position once the manually applied actuation force ceases.

As shown, each of the pushing members 48, 50 can be tapered via tapered sections 48a, 50a to transfer downward pivoting movement of the latching device 22 into lateral movement of the latching members 40, 42 against the urging of the springs 58, 60 and the spring 68. More specifically, the actuator 52 includes a gripping portion 52a disposed on one side of the pivot pin 62 (forward of the pivot pin 62 as shown in FIG. 6) and an engaging portion 52b disposed on the other side of the pivot pin 62. Rotation of the gripping portion 52a, such as clockwise in FIG. 6, causes the engaging portion 52b to pivot downwardly into the tapered portions 48a, 50a of the pushing members 48, 50 to forcibly move the pushing members 48, 50 laterally outwardly. This, in turn, causes the pushing members 48, 50 to forcibly move the latching members 40, 42 laterally outwardly thereby removing the latching members 40, 42 from the latching apertures 44, 46 to unlatch the closure member 18. At this point, the pivoting closure member 18 can be moved to the pivot open position.

Figure 2:
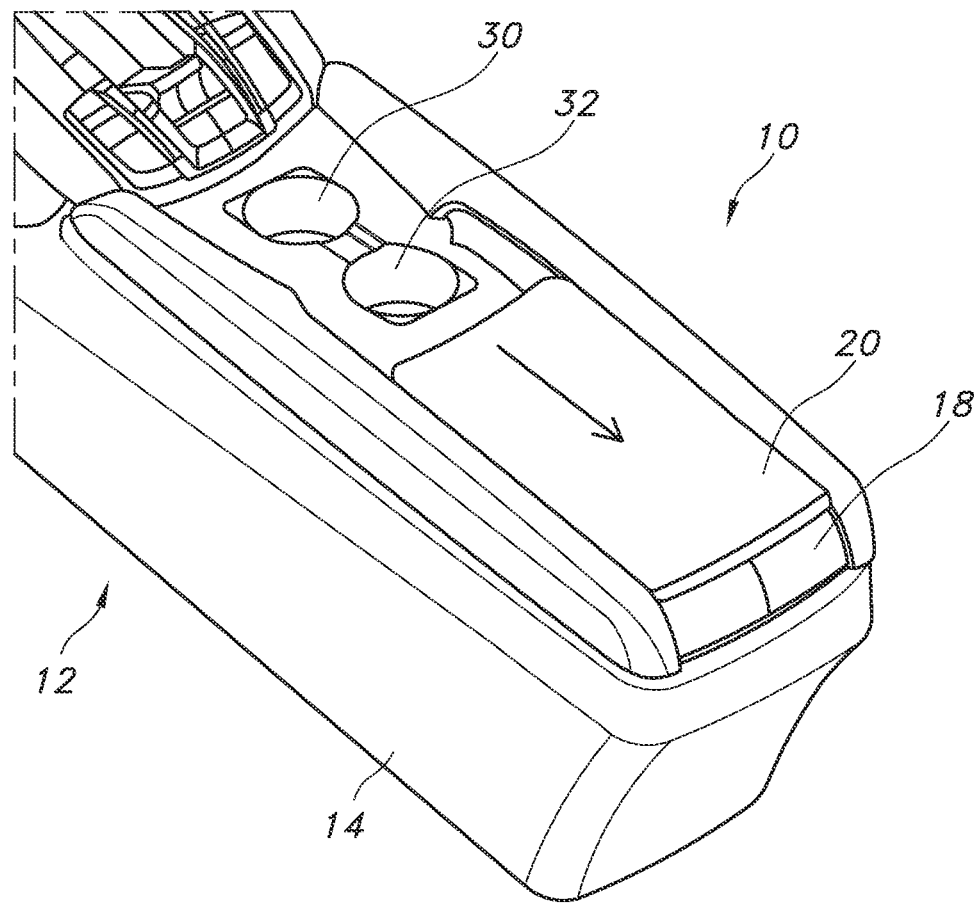
FIG. 2 is a partial perspective view similar to FIG. 1 but showing the armrest member slidably moved to a slide rearward position.

As shown, the closure member 18 can include mounting arms 64, 66 for pivotally mounting the closure member 18 to the console structure 12 and enable pivotal movement from the pivot closed position shown in FIG. 2 to the pivot open position shown in FIG. 3. In particular, these mounting arms 64, 66 can be pivotally mounted to the closure member 18 and arranged so that the pivoting closure member 18 can move between the pivot closed position and the pivot open position when the latching members 40, 42 are disengaged from the closure member 18.

Figure 8:
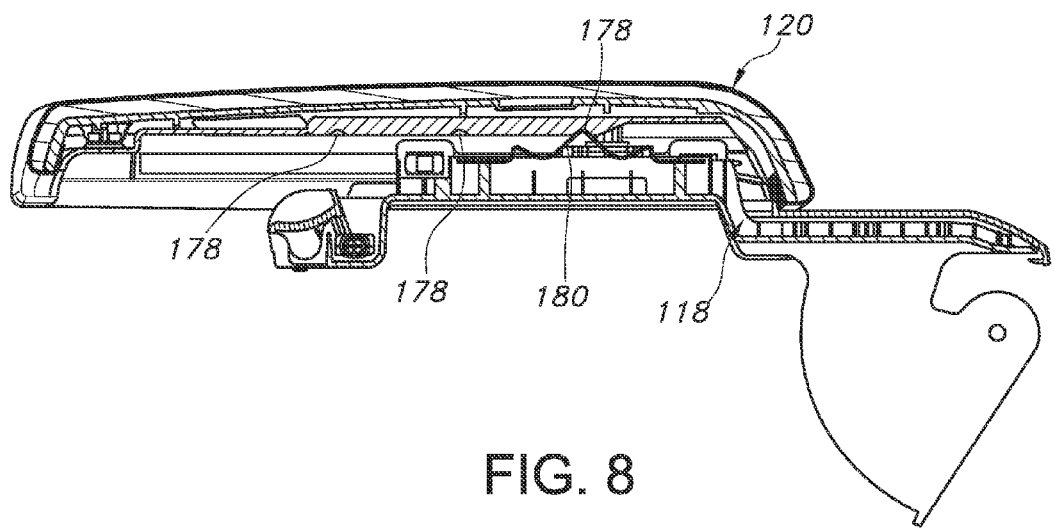
FIG. 8 is a cross-sectional view similar to FIG. 6 but showing a sliding and pivoting armrest assembly according to an alternate exemplary embodiment in a slide forward position.
Figure 9:
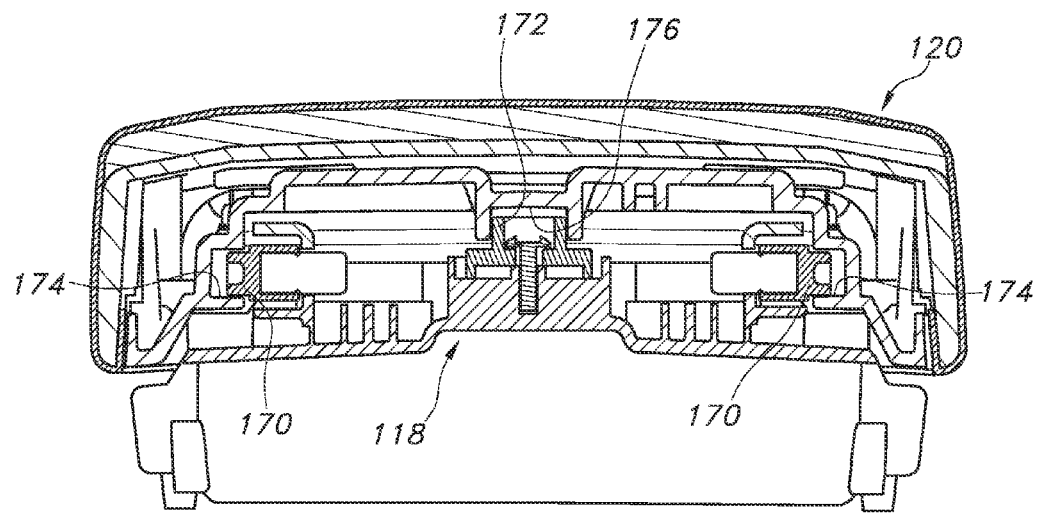
FIG. 9 is a cross-sectional view of the sliding and pivoting armrest assembly of FIG. 8 taken laterally thereacross to show cooperative sliding engagement between a sliding armrest member and a pivoting closure member.
Figure 10:
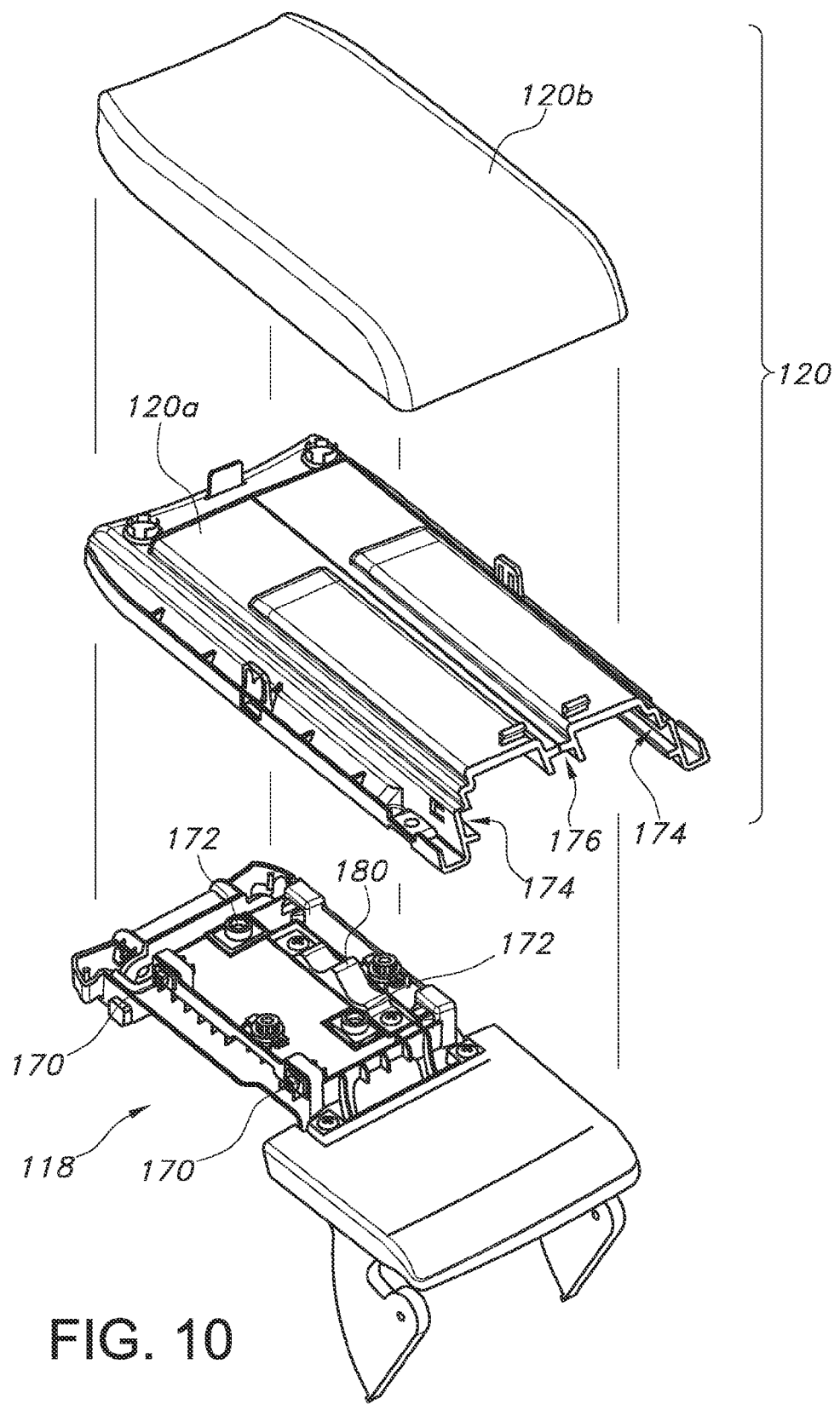
FIG. 10 is an exploded perspective view of the sliding armrest member (shown comprised of two parts) and the pivoting closure member.

With reference now to FIG. 8-10, a pivoting closure member 118 and sliding armrest member 120 are shown according to an alternate exemplary embodiment. Generally, the pivoting closure member 118 can be similar to and can function the same or similarly as the pivoting closure member 18 and the sliding armrest member 120 can be similar to and can function the same or similarly as the sliding armrest member 20. For example, the closure member 118 can be pivotally mounted to a console structure (e.g., the console structure 14) and the sliding armrest member 120 can be slidably mounted to the closure member 18 for sliding movement between a slide open position (shown in FIG. 8) and a slide closed position.

For facilitating and limiting a degree of relative sliding movement, the pivoting closure member 118 can have protruding runner members, including laterally disposed runner members 170 and topside disposed runner members 172, slidably received, respectively, in runner slots 174, 176 defined on the sliding armrest member 120. In particular, in the embodiment illustrated, the sliding armrest member 120 can include a base structure 120*a* defining the slots 174, 176 and an upper cushion member 120*b* securable to the base structure 120*a*. To inhibit undesired sliding movement of the sliding armrest member 120 relative to the pivoting closure member 118, the sliding armrest member 120 can define a plurality of detents 178 and the pivoting closure member 118 can include a leaf spring 180 mounted thereto for selective receipt in one of the detents 178 to lock the position of the sliding armrest member 120 (e.g., in the slide forward position, the slide rearward position or some intermediate position).

The cooperative engagement between the pivoting closure member 118 and the sliding armrest member 120 is merely exemplary and it will be appreciated by those skilled in the art that other devices and/or designs could be employed. For example, the pivoting closure member 118 could define runner slots and the sliding armrest member 120 could define runner members. Also, the arrangement and/or number of runner members and runner slots could vary from those illustrated. Likewise, other devices and/or designs could be used for locking the relative position of the sliding armrest member 120 to the pivoting closure member 118. Further, it is to be appreciated by those skilled in the art that the features shown in association with the pivoting closure member 118 and the sliding armrest member 120 could be applied to the pivoting closure member 18 and the sliding armrest member 20.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A vehicle console with a sliding and pivoting armrest assembly, comprising:
   a console structure defining a storage compartment;
   a closure member pivotally mounted to the console structure for movement between a pivot open position wherein access is provided to the storage compartment and a pivot closed position wherein the closure member closes the storage compartment;
   an armrest member slidably mounted to the closure member for movement between a slide forward position and a slide rearward position; and
   a latching device for selective latching of the closure member and the console structure, the latching device including:
      at least one latching member protruding from the console structure and receivable within at least one latching aperture defined by the closure member to latch the closure member in the pivot closed position,
      at least one pushing member movably mounted to the closure member and arranged for pushing the at least one latching member out of the at least one latching aperture to unlatch the closure member from the console structure, and
      an actuator disposed on the closure member and arranged to laterally move the at least one pushing member upon actuation to unlatch the closure member.

2. The vehicle console with a sliding and pivoting armrest assembly of claim 1 wherein the armrest member extends forward of the closure member when in the slide forward position.

3. The vehicle console with a sliding and pivoting armrest assembly of claim 2 wherein a forward end of the armrest member is approximately aligned with a forward end of the closure member when in the slide rearward position.

4. The vehicle console with a sliding and pivoting armrest assembly of claim 3 wherein the actuator is accessible when the armrest member is in the slide rearward position and is generally hidden and inaccessible when the armrest member is in the slide forward position.

5. The vehicle console with a sliding and pivoting armrest assembly of claim 2 wherein the actuator is disposed on or adjacent a forward end of the closure member and is not accessible when the armrest member is in the slide forward position.

6. The vehicle console with a sliding and pivoting armrest assembly of claim 2 wherein the console structure defines a cup holder that is exposed and accessible when the armrest member is in the slide rearward position, and wherein the cup holder is covered and inaccessible when the armrest member is in the slide forward position and the closure member is in the pivot closed position.

7. The vehicle console with a sliding and pivoting armrest assembly of claim 1 wherein the latching device further includes:
   a biasing mechanism urging the at least one latching member laterally into the at least one latching aperture, wherein actuation of the actuator moves the at least one pushing member laterally into the at least one latching member to move the at least one latching member against the urging of the biasing mechanism and out of the at least one latching aperture.

8. The vehicle console with a sliding and pivoting armrest assembly of claim 7 wherein the at least one latching member is tapered to transfer downward pivoting movement of the latching member into lateral movement of the at least one latching member against the urging of the biasing mechanism.

9. The vehicle console with a sliding and pivoting armrest assembly of claim 1 wherein the actuator is disposed along a forward end of the closure member and the at least one latching member is arranged to protrude into at least one lateral side of the closure member.

10. The vehicle console with a sliding and pivoting armrest assembly of claim 9 wherein the actuator is pivotally mounted to the closure member and arranged such that pivotal movement of the actuator actuates the actuator and moves the at least one pusher member into the at least one latching member.

11. The vehicle console with a sliding and pivoting armrest assembly of claim 10 wherein the actuator and the at least one pushing member are arranged so that pivoting movement of the actuator is transferred into laterally outward movement of the at least one pushing member, and wherein an amount of movement of the actuator corresponds to an amount of movement of the at least one pushing member.

12. The vehicle console with a sliding and pivoting armrest assembly claim 1 wherein receipt of the at least one latching member into the at least one latching aperture provides underside support for the closure member inhibiting further downward pivot movement of the closure member.

13. The vehicle console with a sliding and pivoting armrest assembly of claim 12 wherein the console structure includes at least one shoulder protruding laterally inward below the closure member to provide further underside support for the closure member.

14. The vehicle console with a sliding and pivoting armrest assembly of claim 13 wherein at least one bumper is mounted to the at least one shoulder to cushion contact between the closure member and the at least one shoulder.

15. The vehicle console with a sliding and pivoting armrest assembly of claim 1 wherein the at least one latching member is a pair of latching members protruding laterally inwardly from the console structure and the at least one latching aperture is a pair of latching apertures defined in lateral sides of the closure member for receipt of the pair of latching members.

16. The vehicle console with a sliding and pivoting armrest assembly of claim 15 wherein the at least one pushing member is a pair of pushing members that move laterally outwardly upon actuation of the actuator to push the pair of latching members out of the pair of latching apertures.

17. A sliding and pivoting armrest assembly for a vehicle console, comprising:

a closure member pivotally mounted to the vehicle console;

an armrest member slidably mounted to the closure member for movement between a slide forward position and a slide rearward position; and a latching device for selective latching the closure member in a closed position, the latching device including at least one latching member selectively receivable in at least one latching aperture defined in the closure member, at least one pushing member disposed on the closure member and movable to remove the at least one closure member from the at least one latching aperture and an actuator moving the at least one pushing member, wherein the actuator is accessible when the armrest member is in the slide rearward position and is generally hidden and inaccessible when the armrest member is in the slide forward position.

18. The sliding and pivoting armrest assembly of claim 17 wherein the actuator is disposed at a forward end of the closure member and the at least one latching aperture is defined in at least one lateral side of the closure member.

19. The sliding and pivoting armrest assembly of claim 18 wherein the at least one latching member is spring biased laterally inwardly toward and into the at least one latching aperture when the closure member is a closed position.

20. A vehicle armrest assembly, comprising:

a pivoting closure member;

a sliding armrest member movably mounted to the pivoting closure member; and a latching device including spring biased pins urged laterally inward toward one another into latching apertures defined by the pivoting closure member, the latching member further including pushing pins movable laterally outwardly by an actuator to force the spring biased pins against the urging out of the latching apertures.

* * * * *